(12) United States Patent
Yu

(10) Patent No.: US 9,794,965 B1
(45) Date of Patent: Oct. 17, 2017

(54) AUTONOMOUS AND REMOTE PAIRING OF INTERNET OF THINGS DEVICES UTILIZING A CLOUD SERVICE

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 15/613,826

(22) Filed: Jun. 5, 2017

(51) Int. Cl.
  *H04W 76/02* (2009.01)
  *H04L 29/08* (2006.01)
  *H04W 12/06* (2009.01)
  *H04W 12/08* (2009.01)
  *H04W 12/02* (2009.01)
  *H04W 84/12* (2009.01)
  *H04W 84/18* (2009.01)

(52) U.S. Cl.
  CPC ............ *H04W 76/02* (2013.01); *H04L 67/12* (2013.01); *H04W 12/02* (2013.01); *H04W 12/06* (2013.01); *H04W 12/08* (2013.01); *H04W 84/12* (2013.01); *H04W 84/18* (2013.01)

(58) Field of Classification Search
  CPC ...... H04L 67/12; H04W 12/02; H04W 12/06; H04W 12/08; H04W 76/02; H04W 84/12; H04W 84/18
  See application file for complete search history.

(56) References Cited

U.S. PATENT DOCUMENTS

| | | | |
|---|---|---|---|
| 2015/0121470 A1* | 4/2015 | Rongo | H04L 41/0813 726/4 |
| 2015/0133108 A1* | 5/2015 | Ahmed | H04W 4/008 455/420 |
| 2015/0223277 A1* | 8/2015 | Jovicic | H04B 10/116 455/41.2 |
| 2015/0251102 A1* | 9/2015 | Kuo | A63F 13/215 463/35 |
| 2016/0301540 A1* | 10/2016 | Francescangeli | H04L 12/2809 |
| 2016/0323689 A1* | 11/2016 | Goluboff | H04L 63/0823 |

* cited by examiner

*Primary Examiner* — Benjamin H Elliott, IV

(57) ABSTRACT

A device and a method are disclosed. The device connected to a local area network, includes one or more processors, a machine-readable medium including instructions stored therein, which, when executed by the one or more processors cause the one or more processors to perform operations including broadcasting, by the device, a message wherein the message includes wireless network access credentials of the local area network, detecting, by the device, the presence of one or more devices in response to the broadcasting, prompting a user on a wireless user device for authentication of the one or more devices, and adding the one or more devices to a user account based on a response to the authentication.

24 Claims, 5 Drawing Sheets

AUTONOMOUS AND REMOTE PAIRING OF INTERNET OF THINGS DEVICES UTILIZING A CLOUD SERVICE

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15488211 filed on Apr. 14, 2017; and entitled AN INTERACTIVE AUGMENTED-REALITY IoT DEVICES SYSTEMS AND METHODS. Nonprovisional patent application Ser. No. 15490826 filed on Apr. 18, 2017; and entitled GARAGE DOOR CONTROLLER AND MONITORING SYSTEM AND METHOD

TECHNICAL FIELD

The present disclosure generally relates to internet of things (IoT) devices and in particular, for example, to pairing of the IoT devices in a WiFi™ network.

BACKGROUND

In a world of ever increasing smart devices and smarter technologies, the internet of things (IoT) proposes that everyday objects and devices (e.g., light bulbs, washing machines and cameras) are to have an internet connection, where these objects are enabled to send and/or receive data to and from other devices, thus forming a larger network of connected things (i.e., objects and devices). The IoT promises smarter homes and work environments where all the objects are seamlessly connected and controlled for easier and more convenient operation.

An important aspect of the devices of the IoT is their initial pairing and setup to join the internet. Conventionally, devices that are connected to the internet are connected by joining a WiFi™ network via a WiFi™ router. For example, computers or smart phones are connected via the use of a service set identifier (SSID) and passphrase that are unique to the WiFi™ router that are typed into the computer or the smart device by the user to enable the device to join the WiFi™ router and hence the WiFi™ network. Most of the devices that users have been connecting to WiFi™ routers have had rich computing resources (e.g., displays, keyboards, and other components that make entering the information for a secure connection relatively easy).

However, most of the proposed devices and objects of the IoT being added to the internet from homes, offices, commercial spaces, and industrial facilities are quite small and don't have a display or convenient data entry capability to allow users to configure them. Thus, the devices need to be configured by a smarter device that can transmit the necessary configuration information to join the WiFi™ network. For example, if a user wants to pair an IoT device (e.g., an IP-Camera) with his smart phone, to enable the user to remotely operate the camera from his smart phone, the user needs to enable the IoT device to join the WiFi™ network first. There are a few options to do so; for example, the user might be able to establish a direct connection between the IoT device and the user's smart phone device. The direct connection may be a Universal Serial Bus (USB) connection, Bluetooth low energy (BLE) connection, an Eye camera connection, a Quick Response (QR) connection, or a sound-wave enabled connection.

However, these connections have their limitations. For example, most require that the IoT device is within the reach of the user and/or do have a direct line of sight. For example, if a user wants to enable a large number of light bulbs into the network then this will raise a challenge, one due to the number of bulbs to be connected and another for location of the light bulbs and their accessibility. Another limitation, for example, is when the user has more than one IoT device that needs to be added to the WiFi™ network. This implies that the user must enable the devices one device at a time for all the IoT devices to join the WiFi™ network. A third limitation is that a user needs to within the WiFiT network premises to add a new IoT device. The inconvenience of adding IoT devices only when in the premise of their WiFi™ network and adding IoT devices one at a time and the cost that arises from the need for additional hardware within the IoT device to enable the IoT devices into the WiFi™ network presents challenges to the new and upcoming IoT technology, especially for older already existing WiFi™ routers that are part of older than the 802.11AP WiFi™ standard (e.g., 802.11a). Accordingly, there is a need in the art for a more efficient and convenient approach to connect IoT devices to the WiFi™ network.

SUMMARY

The disclosed subject matter relates to a device. The device is connected to a local area network including, one or more processors, a machine-readable medium comprising instructions stored therein, which, when executed by the one or more processors cause the one or more processors to perform operations including, broadcasting, by the device, a message wherein the message comprises wireless network access credentials of the local area network, detecting, by the device, the presence of one or more devices in response to the broadcasting, prompting a user on a wireless user device for authentication of the one or more devices, and adding the one or more devices to a user account based on a response to the authentication.

The disclosed subject matter also relates to a method. The method including, broadcasting, by a device connected to a local area network, a message wherein the message includes a wireless network access credentials of the local area network, detecting, by the device, the presence of one or more devices in response to the broadcasting, prompting a user on a wireless user device for authentication of the one or more devices; and adding the one or more devices to a user account based on a response to the authentication.

The disclosed subject matter further relates to a non-transitory machine-readable medium including instructions stored therein, which, when executed by one or more processors of a processing system cause the one or more processors to perform operations, broadcasting, by a device connected to a local area network, a message wherein the message includes a wireless network access credentials to the local area network, detecting, by the device, the presence of one or more devices in response to the broadcasting, prompting a user on a wireless user device for authentication of the one or more devices, and adding the one or more devices to a user account based on a response to the authentication.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

According to the subject technology, an IoT device is desired to join a local area network. Another device already in the local area network may broadcast network access credentials where the wireless network access credentials comprise a service set identifier (SSID) word and a passphrase word. The IoT device utilizes the network access credentials to access the local area network. In one or more implementations, the another device detects, the presence of the IoT device in response. The another device further prompts a user on a wireless user device for authentication of the IoT device and adds the IoT device to a user account based on a response to a successful authentication. In some aspects, the user does not need to be in the coverage area of the local area network and the another device will attempt to communicate with the wireless user device via the internet, providing an option to add the IoT device to the local area network even when the user is not in the vicinity of the device.

In some other aspects, the another device communicates with the IoT device through a private network. The private network maybe an ad-hoc network or any other private network that facilitates communications between devices in the private network. For successful communication, another device and the IoT device communicate with each other utilizes a private protocol (e.g., a Software development kit SDK). In one or more implementations, the IoT device broadcast a device information list where the device information list includes at least one of a product type, a product model or a serial number.

Figure 1:
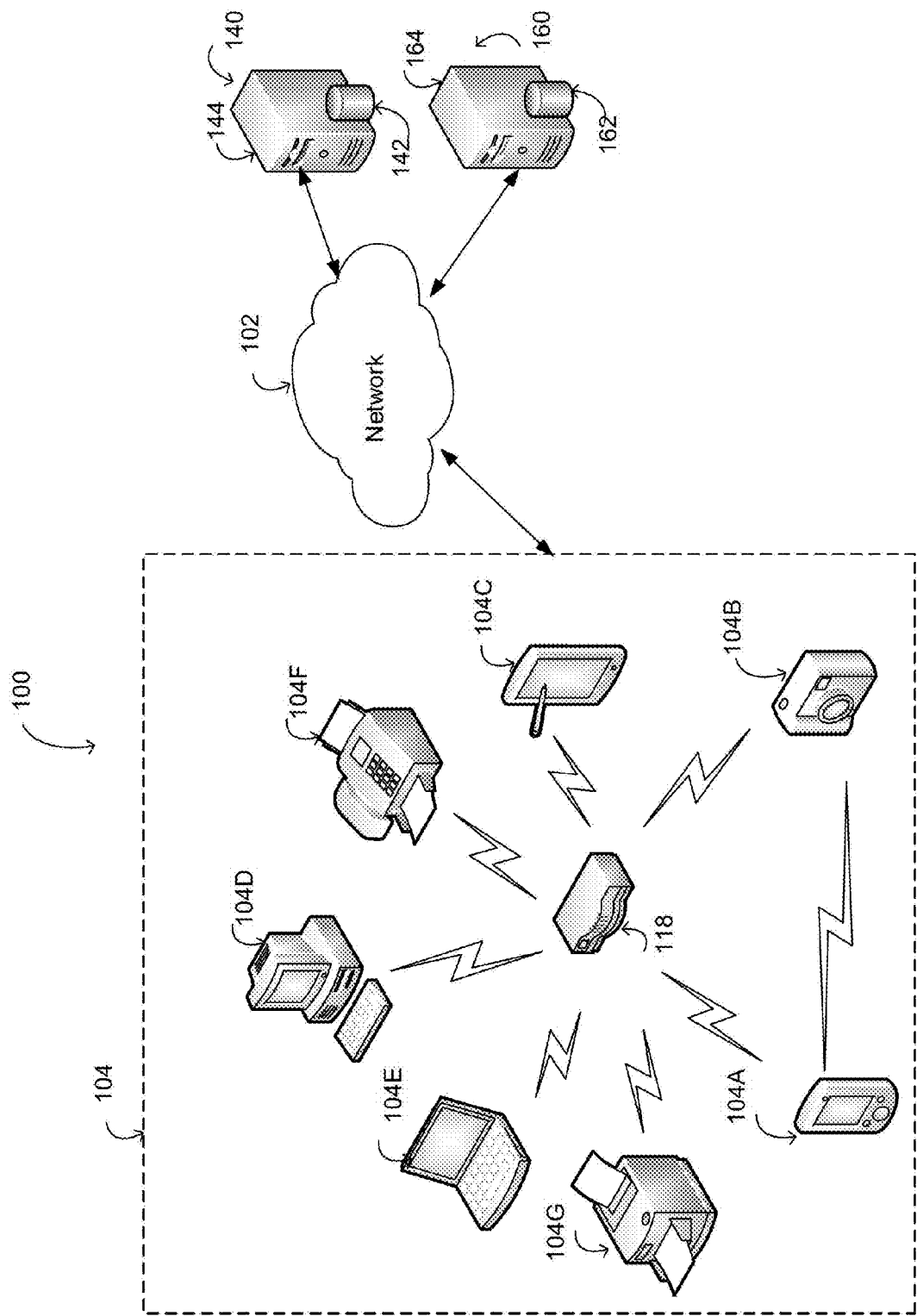
FIG. 1 illustrates an exemplary IoT network environment in accordance with one or more embodiments of the present disclosure.

FIG. 1 illustrates an exemplary IoT network environment 100 in accordance with one or more embodiments of the present disclosure. Network environment 100 includes wireless local network area 104, network 102, and servers 140 and 160. Wireless local network area 104 may include computing devices 104A-104E, peripheral devices 104F and 104G, and wireless access point 118. Servers 140 and 160 may include computing devices 144 and 164 and computer-readable storage devices 142 and 162. The network environment 100 includes a wireless access point 118 that directs communication between computing devices (104A-104E), peripheral devices (104F and 104G) and network 102. One or more of networks 102 and 104 may be referred to as an IoT network and/or a machine-to-machine (M2M) network and computing devices (104A-104E), peripheral devices (104F and 104G) are IoT devices.

In some aspects, network environment 100 can be a distributed client/server system that spans one or more networks such as, for example, network 102. Network 102 can be a large computer network such as, for example, wide area network (WAN), the Internet, a cellular network, or a combination thereof connecting any number of mobile clients, fixed clients, and servers. Further, the network 102 can include, but is not limited to, any of the following network topologies, including a bus network, a star network, a ring network, a mesh network, a star-bus network, tree or hierarchical network, and the like. In some aspects, communication between computing devices (104A-104E), peripheral devices (104F and 104G) and servers 140 and 160 can occur via a virtual private network (VPN), Secure Shell (SSH) tunnel, or other secure network connection. In some aspects, network 102 may further include a corporate network (e.g., intranet) and one or more wireless access points.

Wireless local area network 104 can include, but is not limited to, a computer network that covers a limited geographic area (e.g., a home, school, computer laboratory, or office building) using a wireless distribution method (e.g., spread-spectrum or OFDM). Computing devices (104A-104E) and peripheral devices (104F and 104G) may associate with wireless access point 118 to access wireless local area network 104 using WiFi standards (e.g., IEEE 802.11). Wireless access point 118 may include other network components in addition to a wireless access point. For example, wireless access point 118 may include a router, switch, bridge, broadband modem etc. According to aspects of the subject technology, wireless access point 118 is a wireless router that provides both access point functionality and network routing functionality.

Server 140 may be any system or device having a processor, a memory, and communications capability for providing content and/or services to the computing devices (104A-104E) and peripheral devices (104F and 104G), for example. In some example aspects, the server 140 can include a single computing device 144, for example, or can include more than one computing device working together to perform the actions of a server (e.g., cloud computing, server farm). Further, the server 140 can represent various forms of servers including, but not limited to, a web server, an application server, a proxy server, etc.

Similarly, server 160 may be any system or device having a processor, a memory, and communications capability for providing content and/or services to the computing devices (104A-104E) and peripheral devices (104F and 104G), for example. In some example aspects, the server 160 can be a single computing device 164, for example, or can include more than one computing device working together to perform the actions of a server (e.g., cloud computing, server farm). Further, the server 160 can represent various forms of servers including, but not limited to, a web server, an application server, a proxy server, etc.

A cloud-based service may include services provided by one or more servers, such as server 140 and server 160, via one or more networks, such as network 102. Cloud-based services may require authentication of user account credentials for access via a cloud-based application, such as a web-based personal portal, a web-based email application, etc. A cloud-based service may include a social networking service. A social networking service may enable users to create a profile and associate with other users of the social networking service. For example, a user of a social networking service may have different groups of friends, coworkers, and family, and there may be some overlap among those groups (e.g., a coworker who is also considered to be a friend, a family member who is also a coworker). A social networking service may allow users to share content and messages with other users of the social networking service.

Each of computing devices (104A-104E) and peripheral devices (104F and 104G) may represent various forms of processing devices. By way of example and without limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 1, the computing devices (104A-104E) and peripheral devices (104F and 104G) connect and communicate with the wireless access point 118 using wireless links. These wireless links may be established and managed using various protocols including the IEEE 802.11 protocols. The computing devices (104A-104E) and peripheral devices (104F and 104G), (hereinafter 104A-104G), may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM) voice calls, Short Message Service (SMS), Enhanced Messaging Service (EMS) or Multimedia Messaging Service (MIMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

One or more of the devices (104A-104G) may be referred to as an IoT device and/or an M2M device and may include human-machine interface (HMI) applications and machine-interface applications. There may be multiple paths between one or more of the devices 104A-104G and/or one or more of the networks 102 and 104. In one or more implementations, devices (104A-104G) may utilize a peer-to-peer (P2P) network to establish a communication channel between the devices. One or more of the devices 104A-104G may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104G may include one or more of active devices, passive devices and/or implemented wholly or partially as system on chip devices. Devices 104A-104G may include a transmitter, a receiver, a Global Positioning System (GPS), a Bluetooth (BT)/BLE transceiver and/or a WiFi™ transceiver. In one or more implementations, networks 104 and 106 may include one or more network access points, such as a wireless access point (WAP) where the WAP is capable of transmitting a user datagram packet (UDP), where network 104 does not need to have a pre-established network connection with receiving devices to transmit the UDP packet. In some aspects of technology, one or more of the devices 104A-104G are configured to connect to a wireless access point such as WAP 118 to join a local area network such as local area network 104 utilizing Danale Inc. SMARTADD™ technology.

Peripheral devices 104F and 104G represent devices that provide different functionality to users of the wireless local area network 104. For example, peripheral devices 104F and 104G may be a printer or a multifunction machine that combines printing, scanning and fax functionality. Peripheral devices 104F and 104G may communicate with the wireless access point 118 via a wireless link or may communicate with the wireless access point 118 via a wired connection. In one or more implementations, devices 104A-104G are associated to a user account in a cloud-based service provided by server 140, for example. The user account has a user profile associated to the user. The user profile may contain information and preferences related to wireless user computing devices of the user and devices 104A-104G.

According to aspects of the technology, IoT device 104B (e.g., an IP camera) may require access to the wireless local area network (LAN) 104 based on network access credentials (e.g., SSID and password). The IoT device 104B request to join local area network is authenticated by wireless access point 118, and access is granted based on successful authentication.

In one or more implementations, IoT device 104B is granted access to wireless local network 104 utilizing a second IoT device 104E (e.g., Laptop 104E) to get network access credentials and joins LAN 104 utilizing the network access credentials. In some aspects, second IoT device 104E has already joined the LAN 104 based on network access credentials, which may be provided to the second IoT device 104E via a user interface. Once the second IoT device 104E is authenticated and has access to LAN 104, the IoT device 104E broadcasts the LAN 104 network access credentials for any new or existing IoT device (e.g., IoT device 104B) to receive and utilize the network access credentials to join the LAN 104.

Figure 2:
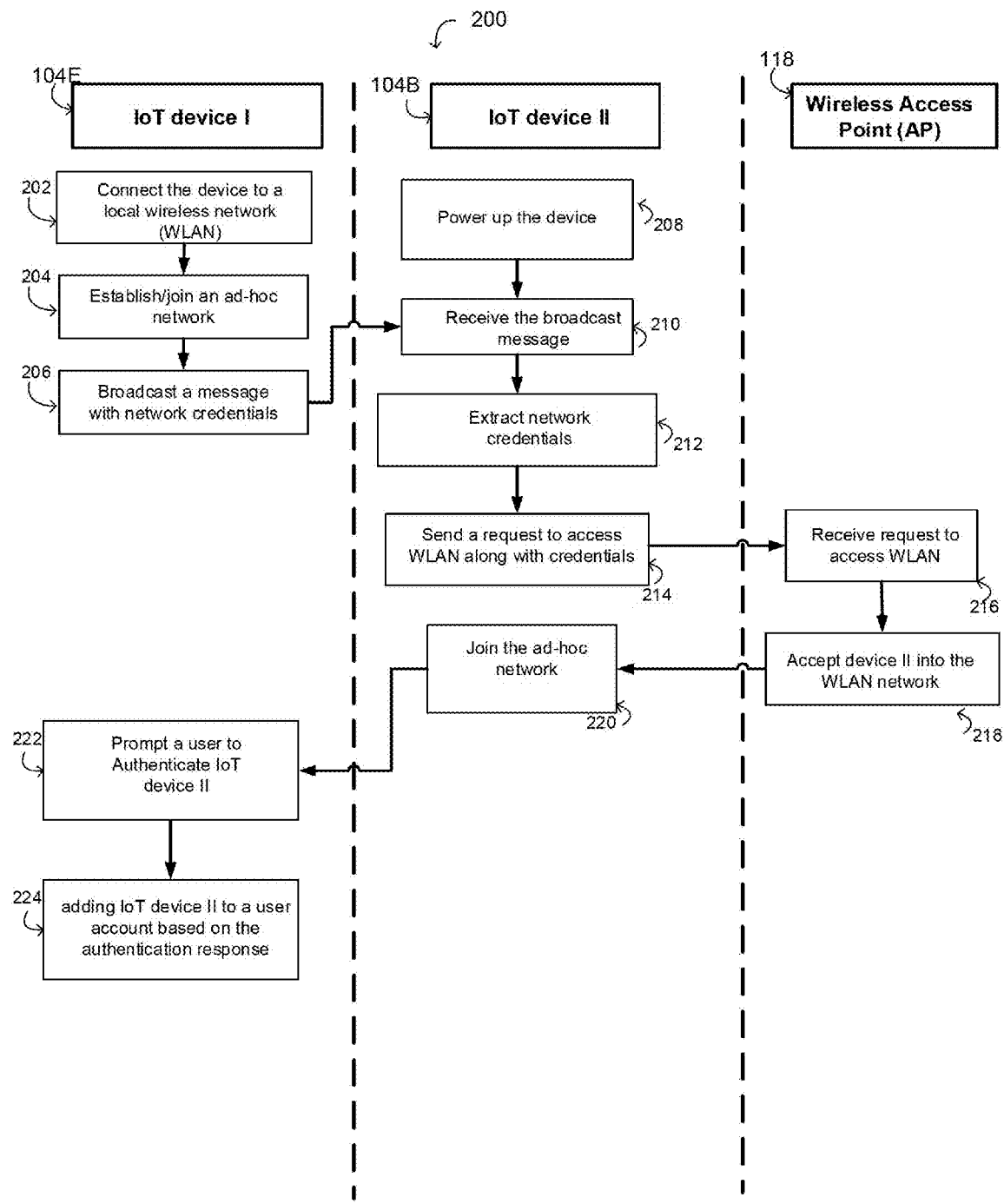
FIG. 2 illustrates a flow chart of a process to add one or more IoT devices autonomously to a local wireless network in accordance with one or more embodiments of the present disclosure.

FIG. 2 illustrates a flow chart of a process 200 to add one or more IoT devices autonomously to a local wireless network in accordance with one or more embodiments of the present disclosure. For explanatory purposes, process 200 is described herein with reference to IoT device I 104E, IoT device II 104B, wireless access point 118, and server 140 of FIG. 1; however, the process 200 is not limited to IoT device I 104E, IoT device II 104B, and wireless access point 118. The process 200 may be performed by one or more components IoT device I, IoT device II, wireless access point 118 and server 140. Further for explanatory purposes, the blocks of the process 200 are described herein as occurring in serial, or linearly. However, multiple blocks of the process 200 may occur in parallel. In addition, the blocks of the process 200 may be performed in a different order than the order shown and/or one or more of the blocks of the process 200 may not be performed.

Wireless access point 118 broadcasts a message indicating availability for authentication based on network access credentials. The broadcast message may be a beacon announcing the presence of the wireless access point 118 and including information about the wireless local area network associated with the wireless access point 118 such as a network identifier (e.g., SSID). In block 202, IoT device I 104E connects to LAN 104 utilizing the wireless network access credentials. In block 204, IoT device I 104E establishes a private network (e.g., ad-hoc network) or joins a pre-existing one. The ad-hoc network provides secondary mean for communicating between the devices on the ad-hoc network via a private protocol. In some aspects, IoT device I 104E broadcasts a message in block 206. The message may include information such as network access credentials to LAN 104.

In one or more implementations, one or more devices (e.g., IoT device II 104B) requires access to LAN 104. In block 208, the IoT device II 104B is powered up and receives the broadcast message of IoT device I 104E as shown in block 210. In block 212, the IoT device II 104B extracts the network access credentials from the broadcast message and sends a request to wireless access point 118 to join the LAN 104 utilizing the extracted network access credentials as shown in block 214. In block 216, wireless access point 118 receives the request to join LAN 104 and accepts IoT device II 104B into LAN 104 based on a successful authentication as shown in block 218.

According to aspects of the technology, IoT device II 104B joins the ad-hoc network as shown in block 220. Once the IoT device II 104B joins the LAN 104 and/or the ad-hoc network IoT device I 104E communicates with a user on a wireless user device (e.g., Smart phone 104A) and prompts the user to authenticate IoT device II 104B as a device the user owns and/or wishes to add to a user profile associated with the user account as shown in block 222. In block 224, upon reception of a user response to the authentication of IoT device 104B, IoT device I 104E adds IoT device II 104B to a user account associated with the user. In one or more implementations, the user profile/user account is saved in a server (e.g., server 140).

Figure 3:
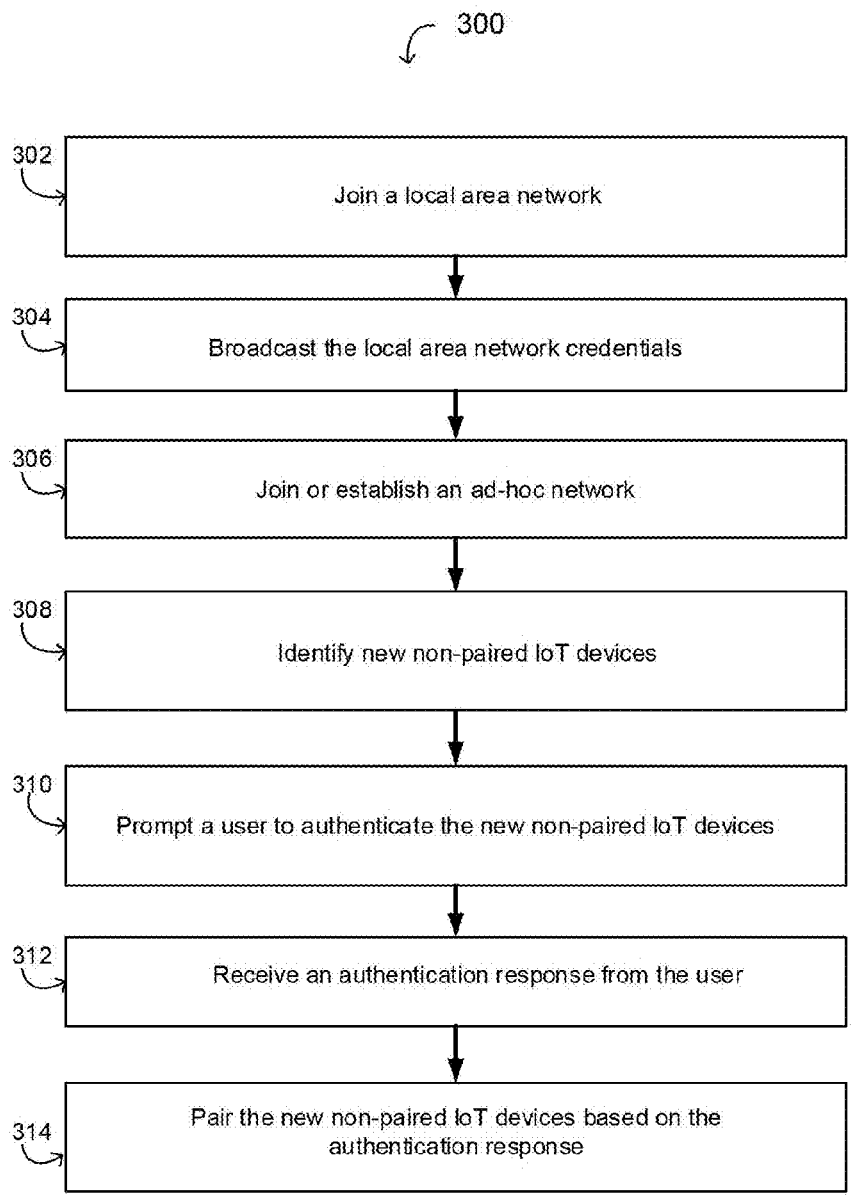
FIG. 3 illustrates an exemplary method of adding one or more IoT devices to a local wireless network in accordance with one or more embodiments of the present disclosure.

FIG. 3 illustrates an exemplary method 300 of adding one or more IoT devices to a local wireless network in accordance with one or more embodiments of the present disclosure. Method 300 may be used independently or in combination with method 400. For explanatory purposes, the exemplary method 300 is described herein with reference to IoT device I 104E, IoT device II 104B, wireless access point 118, and server 140 of FIG. 1; however, the exemplary method 300 is not limited to wireless user device 104A, IP camera 104B, IoT device I 104E, and server 140. The exemplary method 300 may be performed by one or more components of wireless user device 104A, IP camera 104B, IoT device I 104E, and server 140. Further for explanatory purposes, the blocks of the exemplary method 300 are described herein as occurring in serial, or linearly. However, multiple blocks of the exemplary method 300 may occur in parallel. In addition, the blocks of the exemplary method 300 may be performed a different order than the order shown and/or one or more of the blocks of the example process exemplary method 300 may not be performed.

According to aspects of the technology, an IoT device (e.g., IoT device I 104E) joins a local area network (e.g., LAN 104) area as shown in block 302. In block 304, the IoT device broadcast a message where the message includes network access credentials to join the local network area. In block 306, the IoT device I 104E may create a private network (e.g., ad-hoc network) or joins an established ad-hoc network to facilitate communication between IoT device I 104E and other devices within the ad-hoc network via a private protocol. In one or more implementations, devices such as IP-camera 104B receives the broadcast message and extracts network access credentials to join the local area network 104. Upon joining LAN 104 the IP-camera 104B is visible to IoT device 104E. In block 308, IoT device 104E recognizes IP-camera 104B as a non-paired device.

In one or more implementations, IoT device 104E may receive device information from IP-camera 104B via the ad-hoc network. The device information includes information to identify the device. By way of illustration and not by way of limitation, the device information may be a product type, a product model or a serial number or any other information that aids in identifying the device. In block 310, IoT device 104E, prompts a user on a wireless user device (e.g., Smart Phone 104A) to authenticate the new non-paired device IP-camera 104B. In some aspects, IoT device 104E may communicate the device information to the wireless user device to aid in the process of identifying and authenticating the IP camera 104B.

In block 312, IoT device 104E receives an authentication response from the user and based on the authentication response IP-camera 104B is paired with a user account associated with a user profile as shown in block 314.

Figure 4:
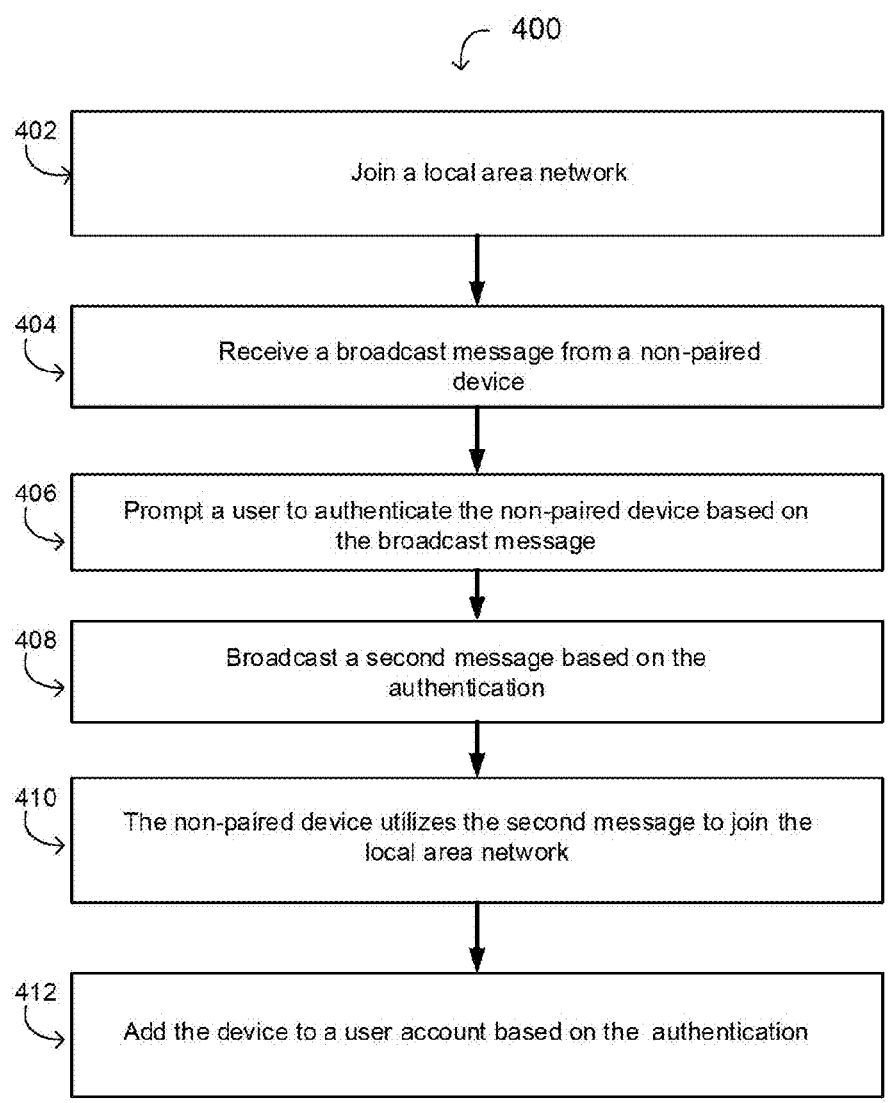
FIG. 4 illustrates a second exemplary method of adding one or more IoT devices to a local wireless network in accordance with one or more embodiments of the present disclosure.

FIG. 4 illustrates a second exemplary method 400 of adding one or more IoT devices to a local wireless network in accordance with one or more embodiments of the present disclosure. Method 400 may be used independently or in combination with method 300. For explanatory purposes, the second exemplary method 400 is described herein with reference to IoT device I 104E, IoT device II 104B (e.g. IP camera 104B), wireless access point 118, and server 140 of FIG. 1; however, the second exemplary method 400 is not limited to wireless user device 104A, IP camera 104B, IoT device I 104E, and server 140. The second exemplary method 400 may be performed by one or more components of wireless user device 104A, IP camera 104B, IoT device I 104E, and server 140. Further for explanatory purposes, the blocks of the second exemplary method 400 are described herein as occurring in serial, or linearly. However, multiple blocks of the second exemplary method 400 may occur in parallel. In addition, the blocks of the second exemplary method 400 may be performed a different order than the order shown and/or one or more of the blocks of the example process second exemplary method 400 may not be performed.

According to aspects of the technology, an IoT device (e.g., IoT device 104E) joins a local area network (e.g., LAN 104) as shown in block 402. A non-paired IoT device such as (IP camera 104B) broadcasts a message where the message contains device information as shown in block 404. The device information includes information to identify the device. By way of illustration and not by way of limitation, the device information may be a product type, a product code, a product model or a serial number or any other information that aids in identifying the device. IoT device 104E receives the broadcast message and prompts a user on a wireless user device 104A for authentication of the IP camera 104B based on the information received by IoT device 104E from non-paired IoT device 104B as shown in block 406.

In one or more implementations, in block 408, the IoT device 104E broadcasts a message where the message includes network access credentials to access LAN 104. In block 410, IoT device 104B utilizes the network access credentials to join LAN 104. In block 412, IoT device 104E adds device 104B to a user account based on the authentication, where the device 104B is now associated with the user account.

Figure 5:
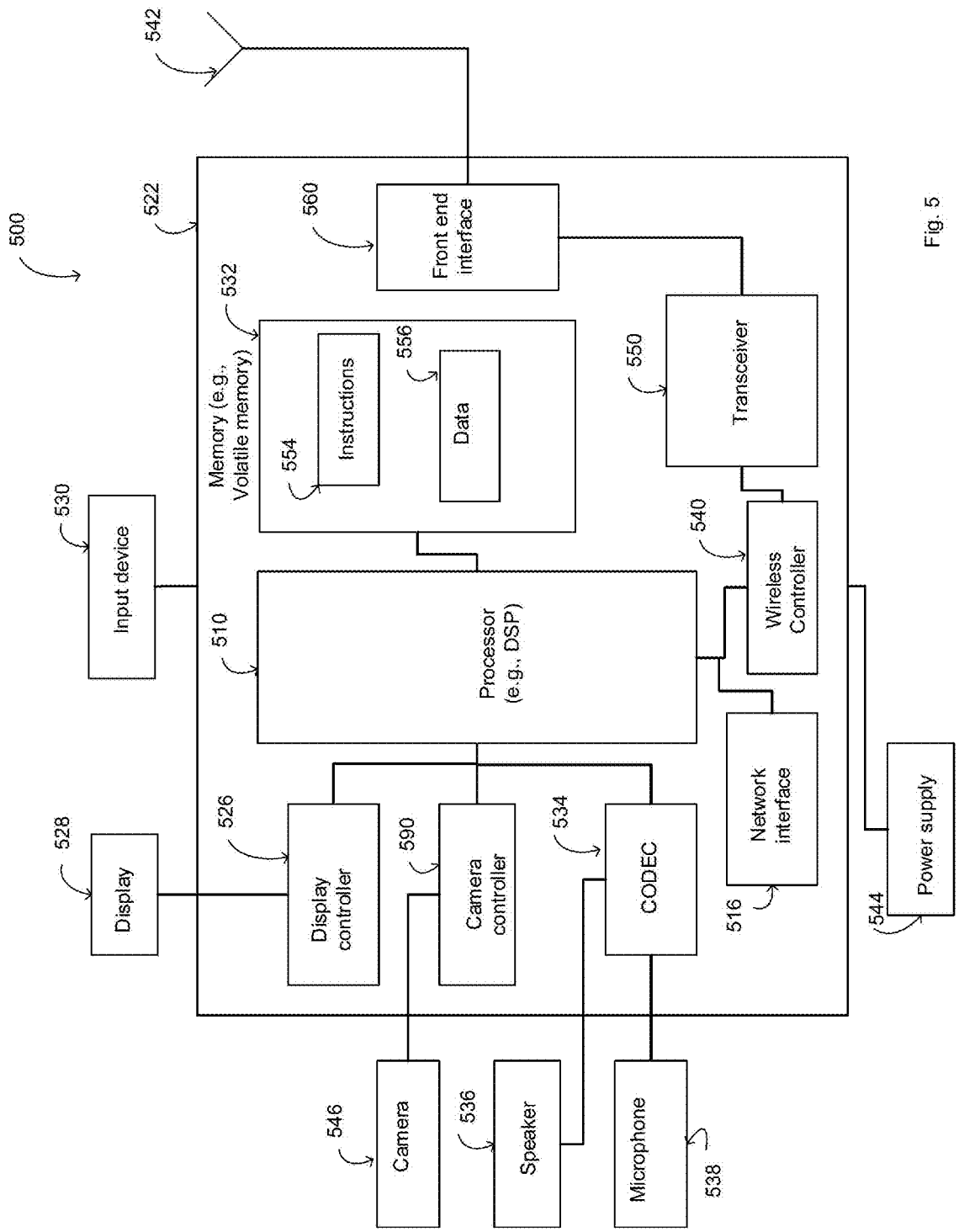
FIG. 5 illustrates conceptually an example electronic system with which some implementations of the present disclosure may be implemented.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510. The processor 510 may be coupled to a computer-readable storage medium, such as a memory 532 (e.g., a non-transitory computer-readable medium or machine-readable medium), via a transceiver 550. Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIGS. 2-4. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed and configured into computer files (e.g. RTL, GDSII, GERBER, etc.) stored on computer-readable media or a machine-readable medium. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable medium or machine-readable medium (alternatively referred to as computer-readable storage media, machine-readable media, or machine-readable storage media). It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A first Internet of Things (IoT) device connected to a local area network comprising:
   one or more processors;
   a machine-readable medium comprising instructions stored therein, which, when executed by the one or more processors cause the one or more processors to perform operations comprising:
broadcasting, by the first IoT device, a message, wherein the message comprises wireless network access credentials to connect to an access point (AP) of the local area network;
detecting, by the first IoT device, the presence of one or more other IoT devices in response to the broadcasting, the response comprising at least identification information of the one or more other IoT devices;
prompting, by the first IoT device, a user on a wireless user device for authentication of the one or more other IoT devices; and
adding the one or more other IoT devices to a user account of the user based on a response to the authentication.

2. The first IoT device of claim 1, wherein the wireless network access credentials comprise a service set identifier (SSID) word and a passphrase word.

3. The first IoT device of claim 1, wherein in response to the broadcasting, the one or more other IoT devices utilize the wireless network access credentials to access the local network area.

4. The first IoT device of claim 1, wherein the first IoT device communicates with the one or more other IoT devices through a private network.

5. The first IoT device of claim 4, wherein the private network is an ad-hoc network.

6. The first IoT device of claim 5, wherein the operation of detecting, by one or more processors, utilizes a private protocol.

7. The first IoT device of claim 1, wherein the operations performed by the one or more processors further comprises receiving from the one or more other IoT devices an IoT device information list.

8. The first IoT device of claim 7, wherein the IoT device information list comprises at least one of a product type, a product model or a serial number.

9. A method comprising:
broadcasting, by a first Internet of Things (IoT) device connected to a local area network, a message, wherein the message comprises wireless network access credentials to connect to an access point (AP) of the local area network;
detecting, by the first IoT device, the presence of one or more other IoT devices in response to the broadcasting, the response comprising at least identification information of the one or more other IoT devices;
prompting, by the first IoT device, a user on a wireless user device for authentication of the one or more other IoT devices; and
adding the one or more other IoT devices to a user account of the user based on a response to the authentication.

10. The method of claim 9, wherein the wireless network access credentials comprise a service set identifier (SSID) word and a passphrase word.

11. The method of claim 9, wherein in response to the broadcasting, the one or more other IoT devices utilize the wireless network access credentials to access the local network area.

12. The method of claim 9, wherein the first IoT device communicates with the one or more other IoT devices through a private network.

13. The method of claim 12, wherein the private network is an ad-hoc network.

14. The method of claim 13, wherein the operation of detecting, by the first IoT device, utilizes a private protocol.

15. The method of claim 9, wherein the operations performed by the first IoT device further comprise receiving from the one or more other IoT devices an IoT device information list.

16. The method of claim 15, wherein the IoT device information list comprises at least one of a product type, a product model or a serial number.

17. A non-transitory machine-readable medium comprising instructions stored therein, which, when executed by one or more processors of a processing system cause the one or more processors to perform operations comprising:
broadcasting, by a first Internet of Things (IoT) device connected to a local area network, a message, wherein the message comprises a wireless network access credentials to connect to an access point (AP) to the local area network;
detecting, by the first IoT device, the presence of one or more other IoT devices in response to the broadcasting, the response comprising at least identification information of the one or more other IoT devices;
prompting, by the first IoT device, a user on a wireless user device for authentication of the one or more other IoT devices; and
adding the one or more other IoT devices to a user account of the user based on a response to the authentication.

18. The non-transitory machine-readable medium of claim 17, wherein the wireless network access credentials comprise a service set identifier (SSID) word and a passphrase word.

19. The non-transitory machine-readable medium of claim 17, wherein in response to the broadcasting, the one or more other IoT devices utilize the wireless network access credentials to access the local network area.

20. The non-transitory machine-readable medium of claim 17, wherein the wireless user device communicates with the one or more other IoT devices through a private network.

21. The non-transitory machine-readable medium of claim 20, wherein the private network is an ad-hoc network.

22. The non-transitory machine-readable medium of claim 20, wherein the operation of detecting, by the first IoT device, utilizes a private protocol.

23. The non-transitory machine-readable medium of claim 17, wherein the operations performed by the first IoT device further comprise receiving from the one or more other IoT devices an IoT device information list.

24. The non-transitory machine-readable medium of claim 23, wherein the IoT device information list comprises at least one of a product type, a product model or a serial number.

* * * * *